US012759028B2

(12) United States Patent
Schuster et al.

(10) Patent No.: US 12,759,028 B2
(45) Date of Patent: Oct. 13, 2026

(54) TANK FOR USE IN MICROGRAVITY

(71) Applicant: Hamilton Sundstrand Space Systems International, Inc., Windsor Locks, CT (US)

(72) Inventors: Ashley Rose Himmelmann Schuster, Chicago, IL (US); Kevin Litton, Houston, TX (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 332 days.

(21) Appl. No.: 18/408,327

(22) Filed: Jan. 9, 2024

(65) Prior Publication Data

US 2025/0222497 A1 Jul. 10, 2025

(51) Int. Cl.
*B08B 9/08* (2006.01)
*B08B 3/10* (2006.01)
*B08B 9/045* (2006.01)

(52) U.S. Cl.
CPC ............ *B08B 9/0808* (2013.01); *B08B 3/102* (2013.01); *B08B 9/045* (2013.01); *B08B 9/0856* (2013.01)

(58) Field of Classification Search
CPC ....... B08B 9/0808; B08B 3/102; B08B 9/045; B08B 9/0856
USPC ........................................................ 15/246.5
See application file for complete search history.

(56) References Cited

U.S. PATENT DOCUMENTS 11,084,007 B2 8/2021 Adams
2011/0038222 A1* 2/2011 Ludwig ............... B01F 33/4535 366/102
2012/0260802 A1 10/2012 Ingham
2018/0281992 A1 10/2018 Manning et al.
2019/0076761 A1* 3/2019 Rau ........................ B01D 29/23
2020/0114282 A1* 4/2020 Johnson ................. B01D 21/02
2022/0040651 A1* 2/2022 Böttcher ................. B01F 23/43

FOREIGN PATENT DOCUMENTS

EP 0570721 A1 11/1993
JP H04353100 A 12/1992

OTHER PUBLICATIONS

Search Report issued in European Patent Application No. 25150661.4; Date of Mailing Jun. 23, 2025 (8 pages).

* cited by examiner

*Primary Examiner* — Katina N. Henson
(74) *Attorney, Agent, or Firm* — CANTOR COLBURN LLP

(57) ABSTRACT

A modified tank for use in microgravity environments is provided. The modified tank includes a membrane defining an interior and including an inlet leading to the interior and first and second outlets from the interior. The modified tank further includes first and second filters for the first and second outlets, respectively, and an outlet wiping pair. The outlet wiping pair includes a wiper in the interior and a wiping boss at an exterior of the membrane. The wiping boss is operably coupled to the wiper whereby operation of the wiping boss causes the wiper to wipe at least one of the first and second filters.

18 Claims, 2 Drawing Sheets

TANK FOR USE IN MICROGRAVITY

BACKGROUND

The present disclosure relates to space toilets and, more particularly, to a tank with modifications for use in microgravity.

The International Space Station (ISS) is the largest modular space station in low Earth orbit. The station serves as a microgravity and space environment research laboratory in which scientific research is conducted in astrobiology, astronomy, meteorology, physics and other fields. The ISS is suited for testing spacecraft systems and equipment required for possible future long-duration missions to the Moon and Mars. The ISS is further suited for habitation by humans for prolonged durations and involves the use of multiple life support systems.

Accordingly, there remains a need for improved life support systems on the ISS as well as on spacecraft.

BRIEF DESCRIPTION

According to an aspect of the disclosure, a modified tank for use in microgravity environments is provided. The modified tank includes a membrane defining an interior and including an inlet leading to the interior and first and second outlets from the interior. The modified tank further includes first and second filters for the first and second outlets, respectively, and an outlet wiping pair. The outlet wiping pair includes a wiper in the interior and a wiping boss at an exterior of the membrane. The wiping boss is operably coupled to the wiper whereby operation of the wiping boss causes the wiper to wipe at least one of the first and second filters.

In accordance with additional or alternative embodiments, the inlet includes a multi-phase inlet by which fluids in multiple phases proceed into the interior, the first outlet includes a single-phase outlet by which a first single-phase fluid exits from the interior, the second outlet includes a single-phase outlet by which a second single-phase fluid exits the interior and the first and second single-phase fluids are of different phases.

In accordance with additional or alternative embodiments, the wiper is disposed between the first and second outlets and the wiper includes an elongate body with a wiping surface that is rotatable into contact with the first and second filters.

In accordance with additional or alternative embodiments, the membrane is continuous between the wiper and the wiping boss.

In accordance with additional or alternative embodiments, the outlet wiping pair is a magnetic outlet wiping pair and the operation of the wiping boss includes rotation of the wiping boss and the wiping boss is magnetically coupled to the wiper whereby the rotation of the wiping boss is magnetically transmitted as rotational energy to the wiper.

In accordance with additional or alternative embodiments, the wiping boss is manually operated.

In accordance with additional or alternative embodiments, the outlet wiping pair further includes a first mounting by which the wiper is mounted to the membrane to allow for rotation of the wiper and to prevent translation of the wiper and a second mounting by which the wiper boss is mounted to the membrane to allow for rotation of the wiper boss and to prevent translation of the wiper boss.

According to an aspect of the disclosure, a modified tank for use in microgravity environments is provided. The modified tank includes a membrane defining an interior and including an inlet leading to the interior and first and second outlets from the interior. The modified tank further includes a stirrer pair including a stirrer at the interior of the membrane and a stirring boss at an exterior of the membrane. The stirring boss is operably coupled to the stirrer whereby operation of the stirring boss causes the stirrer to stir the interior of the membrane.

In accordance with additional or alternative embodiments, the inlet includes a multi-phase inlet by which fluids in multiple phases proceed into the interior, the first outlet includes a single-phase outlet by which a first single-phase fluid exits from the interior, the second outlet includes a single-phase outlet by which a second single-phase fluid exits the interior and the first and second single-phase fluids are of different phases.

In accordance with additional or alternative embodiments, the stirrer is disposed between the inlet and the first and second outlets and the stirrer includes an elongate body with radially outwardly extending baffles.

In accordance with additional or alternative embodiments, the membrane is continuous between the stirrer and the stirring boss.

In accordance with additional or alternative embodiments, the stirrer pair is a magnetic stirrer pair and the operation of the stirring boss comprises rotation of the stirring boss and the stirring boss is magnetically coupled to the stirrer whereby the rotation of the stirring boss is magnetically transmitted as rotational energy to the stirrer.

In accordance with additional or alternative embodiments, the stirring boss is manually operated.

In accordance with additional or alternative embodiments, the stirrer pair further includes a first mounting by which the stirrer is mounted to the membrane to allow for rotation of the stirrer and to prevent translation of the stirrer and a second mounting by which the stirring boss is mounted to the membrane to allow for rotation of the stirring boss and to prevent translation of the stirring boss.

In accordance with additional or alternative embodiments, the membrane is a floating dynamic tank disposed within a static tank and the stirrer pair includes first magnetic elements disposed on the floating dynamic tank and an exterior rotor disposed about the static tank and including second magnetic elements which are magnetically coupled to the first magnetic elements whereby rotation of the exterior rotor causes corresponding rotation of the floating dynamic tank.

According to an aspect of the disclosure, a modified tank for use in microgravity environments is provided. The modified tank includes a membrane defining an interior and including an inlet leading to the interior and first and second outlets from the interior. The modified tank further includes first and second filters for the first and second outlets, respectively, and at least one of a magnetic outlet wiping pair and a magnetic stirrer pair. The magnetic outlet wiping pair includes a wiper in the interior and a wiping boss at an exterior of the membrane. The wiping boss is magnetically coupled to the wiper whereby manual rotation of the wiping boss causes the wiper to wipe at least one of the first and second filters. The magnetic stirrer pair includes a stirrer at the interior of the membrane and a stirring boss at the exterior of the membrane. The stirring boss is magnetically coupled to the stirrer whereby manual rotation of the stirring boss causes the stirrer to stir the interior of the membrane.

In accordance with additional or alternative embodiments, the inlet includes a multi-phase inlet by which fluids in multiple phases proceed into the interior, the first outlet includes a single-phase outlet by which a first single-phase fluid exits from the interior, the second outlet includes a single-phase outlet by which a second single-phase fluid exits the interior and the first and second single-phase fluids are of different phases. The membrane is continuous between the wiper and the wiping boss, the wiper is disposed between the first and second outlets and the wiper includes an elongate body with a wiping surface that is rotatable into contact with the first and second filters.

In accordance with additional or alternative embodiments, the magnetic outlet wiping pair further includes a first mounting by which the wiper is mounted to the membrane to allow for rotation of the wiper and to prevent translation of the wiper and a second mounting by which the wiper boss is mounted to the membrane to allow for rotation of the wiper boss and to prevent translation of the wiper boss.

In accordance with additional or alternative embodiments, the inlet includes a multi-phase inlet by which fluids in multiple phases proceed into the interior, the first outlet includes a single-phase outlet by which a first single-phase fluid exits from the interior, the second outlet includes a single-phase outlet by which a second single-phase fluid exits the interior and the first and second single-phase fluids are of different phases. The membrane is continuous between the stirrer and the stirring boss, the stirrer is disposed between the inlet and the first and second outlets and the stirrer includes an elongate body with radially outwardly extending baffles.

In accordance with additional or alternative embodiments, the magnetic stirrer pair further includes a first mounting by which the stirrer is mounted to the membrane to allow for rotation of the stirrer and to prevent translation of the stirrer and a second mounting by which the stirring boss is mounted to the membrane to allow for rotation of the stirring boss and to prevent translation of the stirring boss.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In microgravity environments, such as those on the ISS, complex measures are taken to enable the storage and separation of multi-phase or single-phase fluids. Current solutions include rotary separators, bellows tanks and bladder tanks, which can all be costly and typically produced as 'one-off' variants for use in space. Rotary separators can be provided as a rotating bowl or rotating disks that create artificial gravity and phase separation. These can handle two-phase fluid flows and provide separation and storage functions. Bellows tanks are often provided as multilayer tanks with structural external components and internal bellows. They can allow for variable storage volume without the introduction of a second-phase fluid. This technology can only handle single-phase fluid flows. For bladder tanks, multilayer tanks can be provided with structural external components and an internal bladder that allows for variable storage volumes without the introduction of a second-phase fluid. This technology can only handle single-phase fluid flows.

Thus, as will be described below, tanks modifications are provided to enable the use of traditional terrestrial tanks for storage and separation while reducing the cost of these functionalities in space. The tank modifications allow a tank to be used in a microgravity environment with multi-phase fluid flows and include an outlet membrane filter, stirrers or mixers and wipers. The outlet membrane filter accomplishes phase separation with an outlet design that should be maintainable to mitigate possible lifetime cost impacts of membrane inclusion in the tank. The stirrers or mixers stir or mix tank contents to thereby enable in-tank mixing to expose the outlet to fluid pertaining to the given outlet (i.e., enable in-tank mixing to expose a water/urine outlet to water/urine). The wipers serve to wipe the tank outlets to prevent outlet membrane filters from becoming blocked by one or more of the fluids.

Figure 1:
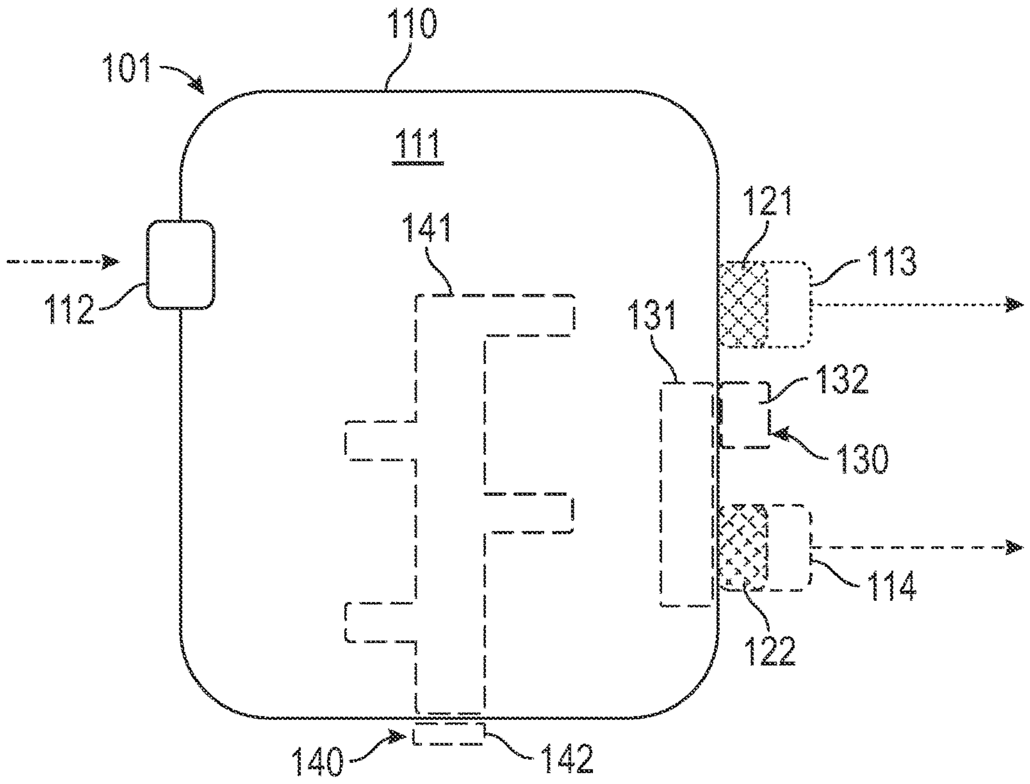
FIG. 1 is a schematic illustration of a modified tank for use in a microgravity environment in accordance with embodiments.

With reference to FIGS. 1, a modified tank 101 is provided for use in microgravity environments, such as those of the ISS. The modified tank 101 includes a membrane 110 that is formed to define an interior 111 and that includes an inlet 112 leading to the interior 111, a first outlet 113 from the interior 111 and a second outlet 114 from the interior 111. The inlet 112 can include or be provided as a multi-phase inlet by which fluids in multiple phases (i.e., liquids and gases) proceed into the interior 111, the first outlet 113 can include or be provided as a single-phase outlet by which a first single-phase fluid (i.e., liquid) exits from the interior 111 and the second outlet 114 can include or be provided as a single-phase outlet by which a second single-phase fluid (i.e., gas) exits the interior 111. In accordance with embodiments, the first and second single-phase fluids are liquids and gases, respectively, and therefore of different phases.

The following description will relate to embodiments in which the inlet 112 is a multi-phase inlet by which liquids and gases proceed into the interior 111, the first outlet 113 is a liquid outlet and the second outlet 114 is a gas outlet. This is being done for purposes of clarity and brevity and is not intended to otherwise limit the scope of this disclosure or the following claims.

The modified tank 101 further includes a first filter 121 for use with the first outlet 113 and a second filter 122 for use with the second outlet 114. The first filter 121 is configured to prevent fluids other than certain liquids from moving through the first outlet 113. The first filter 121 may include or be provided as a hydrophilic filter. The second filter 122 is configured to prevent fluids other than certain gases from moving through the second outlet 114. The second filter 122 may include or be provided as a hydrophobic filter.

The modified tank 101 can further include at least one or both of an outlet wiping pair 130 and a stirrer pair 140 (FIG. 1 illustrates embodiments in which both the outlet wiping pair 130 and the stirrer pair 140 are present but it is to be understood that embodiments exist in which only the outlet wiper pair 130 is present or in which only the stirrer pair 140 is present). The following description will relate to the embodiments in which the outlet wiping pair 130 and the stirrer pair 140 are present. This is being done for purposes of clarity and brevity and is not intended to otherwise limit the scope of this disclosure or the following claims.

The outlet wiping pair 130 includes a wiper 131 in the interior 111 of the membrane 110 and a wiping boss 132 at an exterior of the membrane 110. The membrane 110 is provided as a continuous, smooth, unitary and unbroken or unopened membrane between the wiper 131 and the wiping boss 132 so as to avoid leakage and to avoid forming localized areas that are prone to leakage. The wiper 131 can be disposed between or otherwise proximate to the first outlet 113 and the second outlet 114 and can include an elongate body 1310 with a wiping surface 1311 that is rotatable into contact with the first filter 121 and with the second filter 122. The wiping boss 132 is operably coupled to the wiper 131 whereby operation of the wiping boss 132 causes the wiper 131 to wipe at least one of the first filter 121 and the second filter 122 so as to remove matter that might otherwise block the first filter 121 and the second filter 122.

Figure 2:
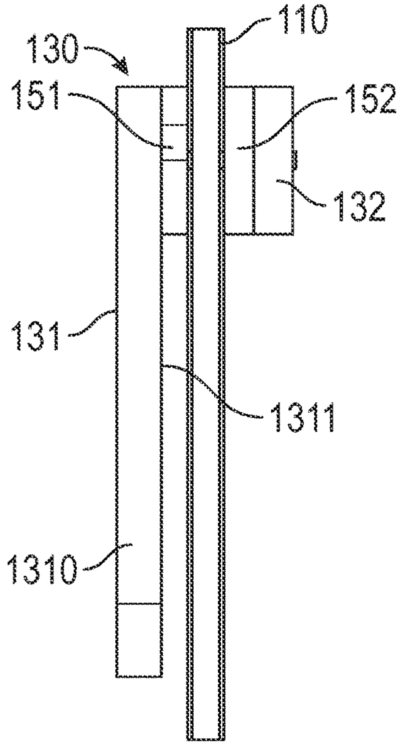
FIG. 2 is a side view of an outlet wiping pair of the modified tank of FIG. 1 in accordance with embodiments.

With continued reference to FIG. 1 and with additional reference to FIG. 2, the outlet wiping pair 130 includes or is provided as a magnetic outlet wiping pair. In these or other cases, the operation of the wiping boss 132 can include rotation of the wiping boss 132 about a rotational axis, which can be defined through a center of the wiping boss 132 and a corresponding portion of the wiper 131, and the wiping boss 132 is magnetically coupled to the corresponding portion of the wiper 131. As such, the rotation of the wiping boss 132 is magnetically transmitted as rotational energy to the wiper 131 which in turn causes the wiper 131 to rotate into contact with and to thereby wipe at least one of the first filter 121 and the second filter 122. The operation of the wiping boss 132 can be executed manually by an operator or automatically by a motor connected to the wiping boss 132.

With continued reference to FIG. 2, the outlet wiping pair 130 can further include a first mounting 151 and a second mounting 152. The first mounting 151 serves as a mounting by which the wiper 131 can be mounted to the membrane 110 to allow for rotation of the wiper 131 and to prevent translation of the wiper 131. The second mounting 152 serves as a mounting by which the wiper boss 132 is mounted to the membrane 110 to allow for rotation of the wiper boss 132 and to prevent translation of the wiper boss 132. Thus, the outlet wiping pair 130 remains in a same general location of the membrane 110 and the wiper 131 and the wiper boss 132 are both free to rotate.

The stirrer pair 140 includes a stirrer 141 in the interior 111 of the membrane 110 and a stirring boss 142 at an exterior of the membrane 110. The membrane 110 is provided as a continuous, smooth, unitary and unbroken or unopened membrane between the stirrer 141 and the stirring boss 132 so as to avoid leakage and to avoid forming localized areas that are prone to leakage. The stirrer 141 can be disposed between the inlet 112 and the first outlet 113 and between the inlet 112 and the second outlet 114 and can include an elongate body 1410 with radially outwardly extending baffles 1411 that is rotatable such that the radially outwardly extending baffles 1411 stir up contents in the interior 111 of the membrane 110. The stirring boss 142 is operably coupled to the stirrer 141 whereby operation of the stirring boss 142 causes the wiper 141 to stir up the contents in the interior 111 of the membrane 110.

Figure 3:
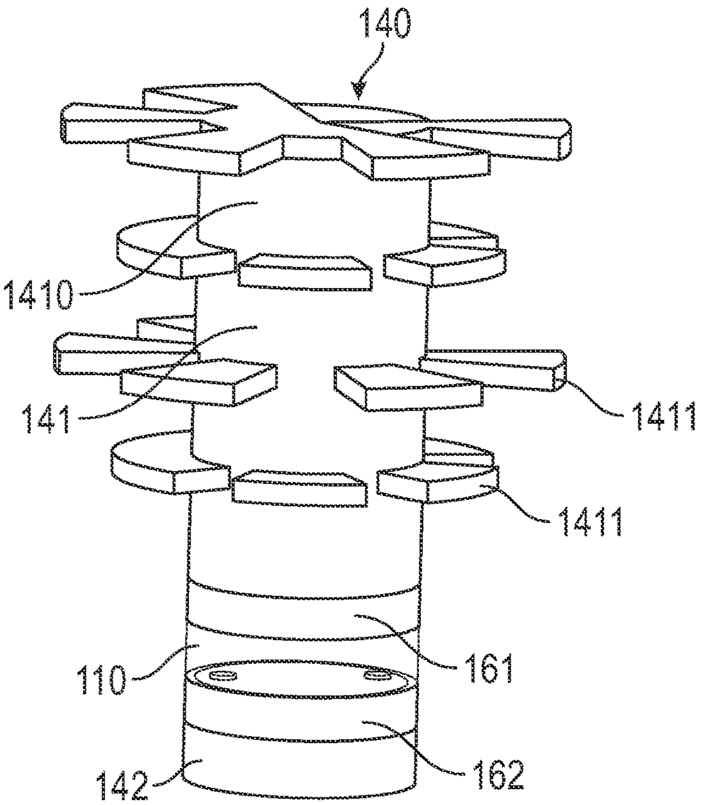
FIG. 3 is a perspective view of a stirrer pair of the modified tank of FIG. 1 in accordance with embodiments.

With continued reference to FIG. 1 and with additional reference to FIG. 3, the stirrer pair 140 includes or is provided as a magnetic stirrer pair. In these or other cases, the operation of the stirring boss 142 can include rotation of the stirring boss 142 about a rotational axis, which can be defined through a center of the stirring boss 142 and a corresponding portion of the stirrer 141, and the stirring boss 142 is magnetically coupled to the corresponding portion of the stirrer 141. As such, the rotation of the stirring boss 142 is magnetically transmitted as rotational energy to the stirrer 141 which in turn causes the stirrer 141 to rotate and to thereby stir up the contents in the interior 111 of the membrane 110. The operation of the stirring boss 142 can be executed manually by an operator or automatically by a motor connected to the stirring boss 142.

With continued reference to FIG. 3, the stirring pair 140 can further include a first mounting 161 and a second mounting 162. The first mounting 161 serves as a mounting by which the stirrer 141 can be mounted to the membrane 110 to allow for rotation of the stirrer 141 and to prevent translation of the stirrer 141. The second mounting 162 serves as a mounting by which the stirring boss 142 is mounted to the membrane 110 to allow for rotation of the stirring boss 142 and to prevent translation of the stirring boss 142. Thus, the stirrer pair 140 remains in a same general location of the membrane 110 and the stirrer 141 and the stirring boss 142 are both free to rotate.

Figure 4:
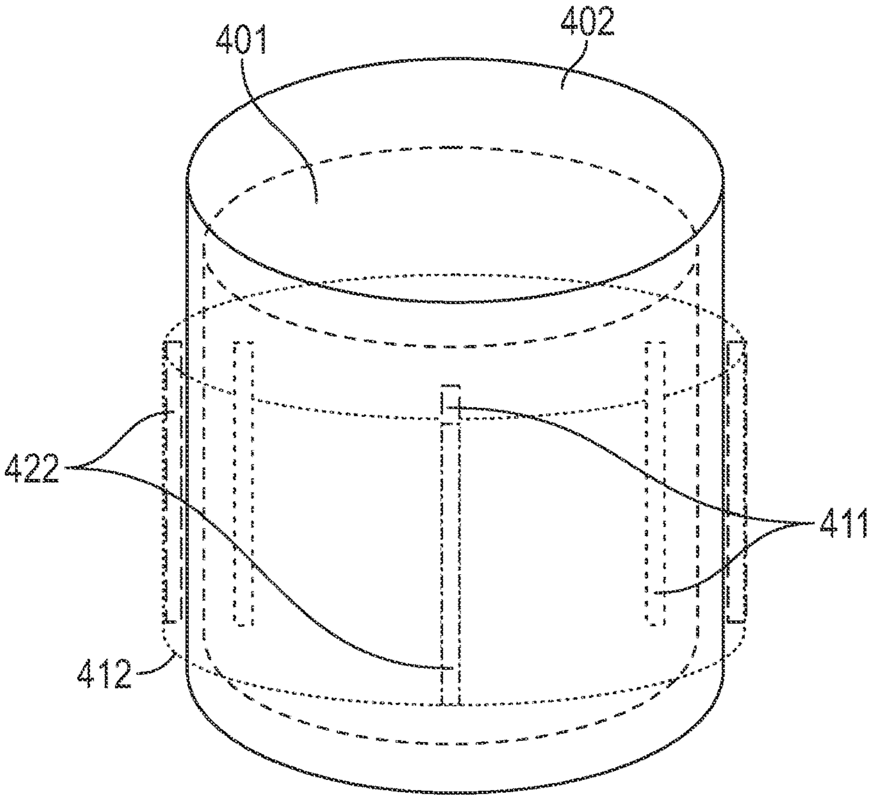
FIG. 4 is a perspective view of a stirrer pair of the modified tank of FIG. 1 where a membrane is provided as a floating dynamic tank in accordance with embodiments.

With reference to FIG. 4, the membrane 110 (see FIGS. 1-3) can include or be provided as a floating dynamic tank 401 that is disposed within a static tank 402. In these or other cases, the stirrer pair 140 can include first magnetic elements 411 disposed on the floating dynamic tank 401 and an exterior rotor 412 that is disposed about the static tank 402 and includes second magnetic elements 422. The second magnetic elements 422 are magnetically coupled to the first magnetic elements 411 whereby rotation of the exterior rotor 412 causes corresponding rotation of the floating dynamic tank 401.

Technical effects and benefits of the present disclosure are the provision of tank modifications that enable the use of terrestrial, low-cost fluid storage technologies in microgravity applications. The tank modifications have no rotating features or dynamic seals required that could otherwise cause eventual leakage. The tank modifications can be relatively easily transitioned while in use to a simple and low-mass tank for surface operations.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A modified tank for use in microgravity environments, the modified tank comprising:

a membrane defining an interior and comprising an inlet leading to the interior and first and second outlets from the interior;

first and second filters for the first and second outlets, respectively; and an outlet wiping pair comprising:

a wiper in the interior; and a wiping boss at an exterior of the membrane, which is operably coupled to the wiper whereby operation of the wiping boss causes the wiper to wipe at least one of the first and second filters, wherein the membrane is continuous and unopened between the wiper and the wiping boss.

2. The modified tank according to claim 1, wherein:

the inlet comprises a multi-phase inlet by which fluids in multiple phases proceed into the interior, the first outlet comprises a single-phase outlet by which a first single-phase fluid exits from the interior, the second outlet comprises a single-phase outlet by which a second single-phase fluid exits the interior, and the first and second single-phase fluids are of different phases.

3. The modified tank according to claim 2, wherein:

the wiper is disposed between the first and second outlets, and the wiper comprises an elongate body with a wiping surface that is rotatable into contact with the first and second filters.

4. The modified tank according to claim 1, wherein the outlet wiping pair is a magnetic outlet wiping pair and:

the operation of the wiping boss comprises a first rotation of the wiping boss with the wiper at the first filter and a second rotation of the wiping boss with the wiper at the second filter, and the wiping boss is magnetically coupled to the wiper whereby each of the first rotation of the wiping boss and the second rotation of the wiping boss is magnetically transmitted as rotational energy to the wiper.

5. The modified tank according to claim 4, wherein the wiping boss is manually operated.

6. The modified tank according to claim 4, wherein the outlet wiping pair further comprises:

a first mounting by which the wiper is mounted to an inside surface of the membrane to allow for a first rotation of the wiper corresponding to the first rotation of the wiping boss and a second rotation of the wiper corresponding to the second rotation of the wiping boss and to prevent translation of the wiper; and a second mounting by which the wiping boss is mounted to an outside surface of the membrane to allow for the first rotation of the wiping boss and the second rotation of the wiping boss and to prevent translation of the wiping boss.

7. A modified tank for use in microgravity environments, the modified tank comprising:

a membrane defining an interior and comprising an inlet leading to the interior and first and second outlets from the interior; and a stirrer pair comprising:

a stirrer at the interior of the membrane; and a stirring boss at an exterior of the membrane, which is operably coupled to the stirrer whereby operation of the stirring boss causes the stirrer to stir the interior of the membrane, wherein the membrane is continuous, smooth and unopened between the stirrer and the stirring boss.

8. The modified tank according to claim 7, wherein:

the inlet comprises a multi-phase inlet by which fluids in multiple phases proceed into the interior, the first outlet comprises a single-phase outlet by which a first single-phase fluid exits from the interior, the second outlet comprises a single-phase outlet by which a second single-phase fluid exits the interior, and the first and second single-phase fluids are of different phases.

9. The modified tank according to claim 8, wherein:

the stirrer is disposed between the inlet and the first and second outlets, and the stirrer comprises an elongate body with radially outwardly extending baffles.

10. The modified tank according to claim 7, wherein the stirrer pair is a magnetic stirrer pair and:

the operation of the stirring boss comprises rotation of the stirring boss, and the stirring boss is magnetically coupled to the stirrer whereby the rotation of the stirring boss is magnetically transmitted as rotational energy to the stirrer.

11. The modified tank according to claim 10, wherein the stirring boss is manually operated.

12. The modified tank according to claim 10, wherein the stirrer pair further comprises:

a first mounting by which the stirrer is mounted to an inside surface of the membrane to allow for rotation of the stirrer and to prevent translation of the stirrer; and a second mounting by which the stirring boss is mounted to an outside surface of the membrane to allow for rotation of the stirring boss and to prevent translation of the stirring boss.

13. The modified tank according to claim 7, wherein:

the membrane is a floating dynamic tank disposed within a static tank, and the stirrer pair comprises:

first magnetic elements disposed on the floating dynamic tank; and an exterior rotor disposed about the static tank and comprising second magnetic elements which are magnetically coupled to the first magnetic elements whereby rotation of the exterior rotor causes corresponding rotation of the floating dynamic tank.

14. A modified tank for use in microgravity environments, the modified tank comprising:

a membrane defining an interior and comprising an inlet leading to the interior and first and second outlets from the interior;

first and second filters for the first and second outlets, respectively; and at least one of:

a magnetic outlet wiping pair comprising a wiper in the interior and a wiping boss at an exterior of the membrane, which is magnetically coupled to the wiper whereby manual rotation of the wiping boss causes the wiper to wipe at least one of the first and second filters; and a magnetic stirrer pair comprising a stirrer at the interior of the membrane and a stirring boss at the exterior of the membrane, which is magnetically coupled to the stirrer whereby manual rotation of the stirring boss causes the stirrer to stir the interior of the membrane, the membrane is continuous, smooth and unopened between the wiper and the wiping boss and between the stirrer and the stirring boss.

15. The modified tank according to claim 14, wherein:

the inlet comprises a multi-phase inlet by which fluids in multiple phases proceed into the interior, the first outlet comprises a single-phase outlet by which a first single-phase fluid exits from the interior, the second outlet comprises a single-phase outlet by which a second single-phase fluid exits the interior and the first and second single-phase fluids are of different phases, and the wiper is disposed between the first and second outlets and the wiper comprises an elongate body with a wiping surface that is rotatable into contact with the first and second filters.

16. The modified tank according to claim 15, wherein the magnetic outlet wiping pair further comprises:

a first mounting by which the wiper is mounted to an inside surface of the membrane to allow for rotation of the wiper and to prevent translation of the wiper; and a second mounting by which the wiping boss is mounted to an outside surface of the membrane to allow for rotation of the wiping boss and to prevent translation of the wiping boss.

17. The modified tank according to claim 14, wherein:

the inlet comprises a multi-phase inlet by which fluids in multiple phases proceed into the interior, the first outlet comprises a single-phase outlet by which a first single-phase fluid exits from the interior, the second outlet comprises a single-phase outlet by which a second single-phase fluid exits the interior and the first and second single-phase fluids are of different phases, and the stirrer is disposed between the inlet and the first and second outlets and the stirrer comprises an elongate body with radially outwardly extending baffles.

18. The modified tank according to claim 17, wherein the magnetic stirrer pair further comprises:

a first mounting by which the stirrer is mounted to an inside surface of the membrane to allow for rotation of the stirrer and to prevent translation of the stirrer; and a second mounting by which the stirring boss is mounted to an outside surface of the membrane to allow for rotation of the stirring boss and to prevent translation of the stirring boss.

* * * * *